United States Patent
Wium

(10) Patent No.: US 9,151,430 B2
(45) Date of Patent: Oct. 6, 2015

(54) VALVE FOR SUBSEA HYDRATE INHIBITOR INJECTION

(75) Inventor: Rolf Wium, Drammen (NO)

(73) Assignee: Roxar Flow Measurement AS, Stavanger (NO)

( * ) Notice: Subject to any disclaimer, the term of this patent is extended or adjusted under 35 U.S.C. 154(b) by 283 days.

(21) Appl. No.: 13/322,214

(22) PCT Filed: May 21, 2010

(86) PCT No.: PCT/EP2010/057063
§ 371 (c)(1),
(2), (4) Date: Dec. 21, 2011

(87) PCT Pub. No.: WO2010/136406
PCT Pub. Date: Dec. 2, 2010

(65) Prior Publication Data
US 2012/0097400 A1    Apr. 26, 2012

(30) Foreign Application Priority Data
May 25, 2009  (NO) .................................... 20092006

(51) Int. Cl.
*F16K 47/06* (2006.01)
*F16K 47/12* (2006.01)
*F16L 55/027* (2006.01)

(52) U.S. Cl.
CPC ........... *F16L 55/02772* (2013.01); *F16K 47/06* (2013.01); *F16K 47/12* (2013.01)

(58) Field of Classification Search
CPC . E21B 33/035; E21B 2034/002; E21B 21/10; E21B 21/106; E21B 2034/005; E21B 34/00; E21B 34/102

USPC ................ 166/339, 344, 368, 373, 386, 90.1, 166/332.1, 332.2; 138/43, 46, 37, 40, 42
See application file for complete search history.

(56) References Cited

U.S. PATENT DOCUMENTS 2,402,729 A * 6/1946 Buchanan ........................ 138/43
3,973,586 A * 8/1976 Hill et al. ....................... 137/460
(Continued)

FOREIGN PATENT DOCUMENTS

| EP | 1 519 099 | 3/2005 |
| GB | 2 413 639 | 11/2005 |
| WO | WO 2006/031335 | 3/2006 |

OTHER PUBLICATIONS

International Search Report for PCT/EP2010/057063, mailed Sep. 17, 2010.
(Continued)

*Primary Examiner* — Matthew Buck
*Assistant Examiner* — Edwin Toledo-Duran
(74) *Attorney, Agent, or Firm* — Nixon & Vanderhye P.C.

(57) ABSTRACT

Valve for throttling the flow rate of a fluid, distinguished in that it comprises a bolt (12), a pipe section (8) having inner dimension adapted to enclose the bolt sealingly, a groove (13) in at least one of the outer surface of the bolt and the inner surface of the pipe section, the groove providing a fluid passageway between the enclosed bolt and pipe section, an inlet port having fluid connection to an upstream end of the groove, an outlet port having fluid connection to a downstream end of the groove, and means to adjust a coaxial position of the bolt (12) relative to the pipe (8), by moving one or both of the bolt and pipe section, in order to adjust the throttling effect of the valve. System comprising valves of the invention.

31 Claims, 3 Drawing Sheets

(56) References Cited

U.S. PATENT DOCUMENTS

Figures 1, 2:
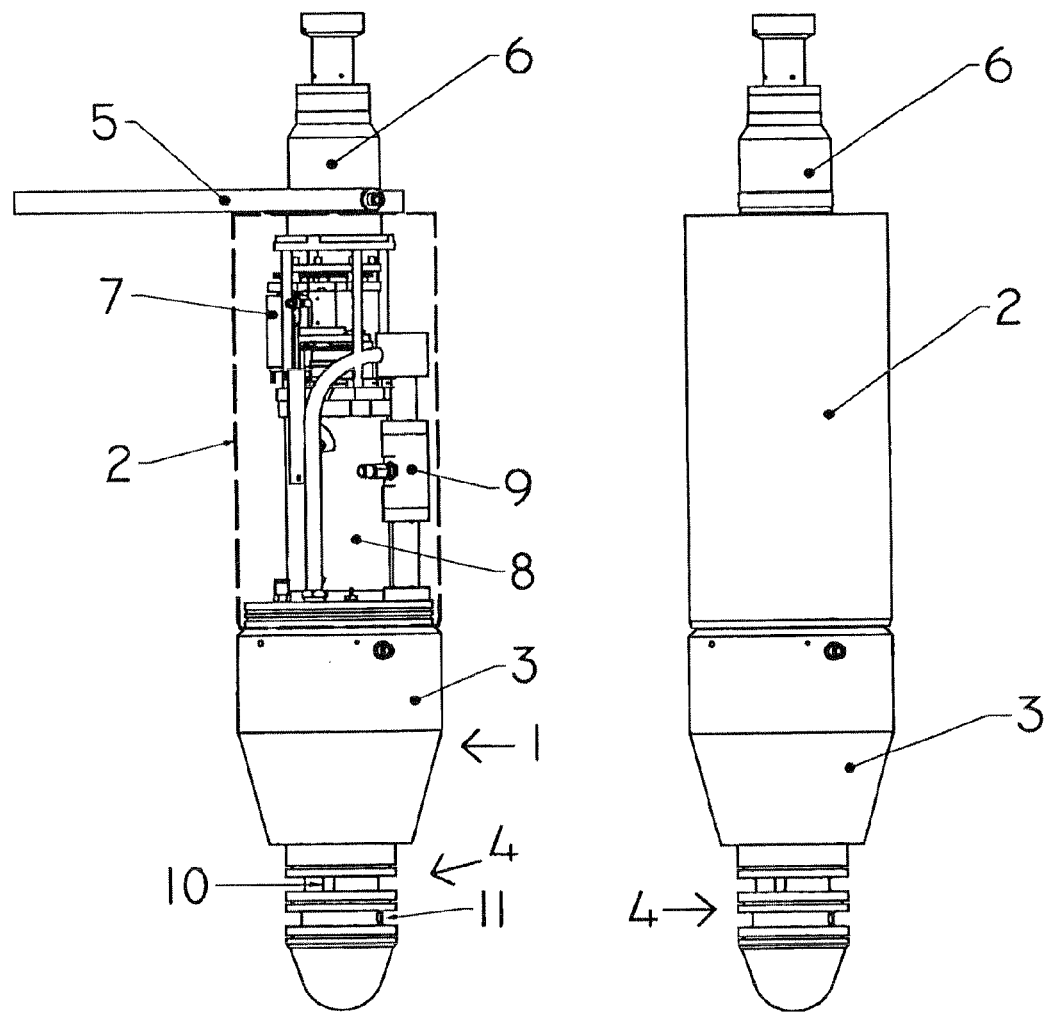

| | | | |
|---|---|---|---|
| 4,106,525 A * | 8/1978 | Currie et al. | 138/43 |
| 4,315,523 A * | 2/1982 | Mahawili et al. | 137/486 |
| 4,721,158 A * | 1/1988 | Merritt et al. | 166/250.01 |
| 5,194,012 A * | 3/1993 | Cairns | 439/201 |
| 5,558,532 A * | 9/1996 | Hopper | 439/310 |
| 5,570,744 A * | 11/1996 | Weingarten et al. | 166/357 |
| 5,738,172 A * | 4/1998 | van Mook et al. | 166/344 |
| 5,794,701 A * | 8/1998 | Cunningham et al. | 166/341 |
| 6,009,950 A * | 1/2000 | Cunningham et al. | 166/344 |
| 6,283,444 B1 * | 9/2001 | Smith, III | 251/149.7 |
| 6,481,504 B1 * | 11/2002 | Gatherar | 166/344 |
| 6,823,941 B2 * | 11/2004 | Donald | 166/368 |
| 6,851,444 B1 * | 2/2005 | Kohl et al. | 137/13 |
| 6,998,724 B2 * | 2/2006 | Johansen et al. | 290/1 R |
| 7,108,069 B2 * | 9/2006 | Killie et al. | 166/336 |
| 7,234,524 B2 * | 6/2007 | Shaw et al. | 166/304 |
| 7,243,729 B2 * | 7/2007 | Tyrrell et al. | 166/338 |
| 7,380,835 B2 * | 6/2008 | McCoy et al. | 285/24 |
| 8,327,875 B2 * | 12/2012 | Grace et al. | 137/487.5 |
| 2002/0011336 A1 * | 1/2002 | Baskett et al. | 166/368 |
| 2002/0070026 A1 * | 6/2002 | Fenton et al. | 166/368 |
| 2002/0108755 A1 * | 8/2002 | Zisk, Jr. | 166/369 |
| 2003/0024704 A1 * | 2/2003 | Hirsch et al. | 166/313 |
| 2004/0262008 A1 * | 12/2004 | Deans et al. | 166/339 |
| 2005/0166961 A1 * | 8/2005 | Means et al. | 137/13 |
| 2006/0037644 A1 * | 2/2006 | Nishikawa et al. | 137/487.5 |
| 2008/0257032 A1 * | 10/2008 | Zollo et al. | 73/152.29 |
| 2009/0025936 A1 * | 1/2009 | Donald et al. | 166/344 |
| 2010/0126600 A1 * | 5/2010 | Watson | 137/486 |
| 2012/0325488 A1 * | 12/2012 | Grace et al. | 166/351 |

OTHER PUBLICATIONS

Norwegian Search Report for Norway Application No. 2009 2006, dated Dec. 18, 2009.

International Preliminary Report on Patentability for PCT/EP2010/057063, dated Aug. 5, 2011, 9 pages.

* cited by examiner

VALVE FOR SUBSEA HYDRATE INHIBITOR INJECTION

This application is the U.S. national phase of International Application No. PCT/EP2010/057063, filed 21 May 2010, which designated the U.S. and claims priority to Norway Application No. 2009 2006, filed 25 May 2009, the entire contents of each of which are hereby incorporated by reference.

FIELD OF THE INVENTION

The present invention relates to valves and devices for throttling a flow. More specifically, the invention relates to a valve for throttling a high-flow rate fluid, such as a hydrate inhibitor, and a system for injection flow throttling to a number of wells on a seabed.

Background of the Invention and Prior Art

Currently injection fluids are typically throttled or controlled by valves such as needle valves. This provides accuracy, however needle valves and other traditional control valves are susceptible to malfunction for several reasons. One typical reason for malfunction is clogging due to contamination by particles such as sand, another is mechanical wear or damage of the parts, particularly the moving parts. For injection fluids requiring a relative high flow rate, such as hydrate inhibitors to be injected at a deep water subsea production wellhead, malfunctions such as caused by clogging is a significant risk, which malfunction will result in shut down of production. Long term cost, ease of installation, retrieval and replacement of parts are also significant factors.

At present there is a demand for a valve for throttling fluids such as hydrate inhibitors to be injected at a subsea wellhead into a production flow, having improved properties with respect to reliable operation and risk for malfunction, in addition to being easy to manufacture, install and retrieve. Further, there is also a demand for a system for injection flow throttling to a number of wells on a seabed, providing improved reliability and contingency.

Summary of the Invention

The objective of the present invention is to meet the above mentioned demands.

Accordingly, the present invention provides a valve for throttling the flow rate of a fluid, distinguished in that it comprises
 a bolt,
 a pipe section having inner dimension adapted to enclose the bolt sealingly,
 a groove in at least one of the outer surface of the bolt and the inner surface of the pipe section, the groove providing a fluid passageway between the enclosed bolt and pipe section,
 an inlet port having fluid connection to an upstream end of the groove,
 an outlet port having fluid connection to a downstream end of the groove, and
 means to adjust a coaxial position of the bolt relative to the pipe, by moving one or both of the bolt and pipe section, in order to adjust the throttling effect of the valve.

Inhibitors, such as hydrate inhibitors, i.e. glycols or methanol, are often recycled from the production flow for reinjection. However, this may cause gradual build up of sand contents and other contaminations. The valve of the invention is ideal for injecting such fluids, alone or in mixtures with other fluids, as the whole throttling bore is flushed at all times of operation and the design can withstand even severe contamination without undue erosion. Testing has proved that the valve of the invention is particularly advantageous over other valve designs for injecting contaminated fluids such as regenerated inhibitors.

The valve functions by having a long, variable throttling section of large cross section for flow, reducing the risk for clogging. More specifically, the inlet flow is directed towards the groove, the groove providing a fluid passageway between the enclosed bolt and pipe section, thereby forcing the fluid to follow the flow path as defined by the groove and pipe section for the length of the groove enclosed (i.e. enclosed or confined groove) by the pipe section. The meaning of the pipe section having inner dimension adapted to enclose the bolt sealingly, is that leakage ways for fluids along the enclosed length are in principle sealed except for the fluid passageway as provided by the groove. The groove, or more specifically the confined or enclosed groove, represents a flow path of increased friction, having adjustable length by adjusting the position of the bolt or pipe section, thereby providing adjustable friction or throttling effect.

The bolt will typically be a solid or massive bolt, however, the bolt may be hollow, including one or more bores. Accordingly, the bolt can be a pipe section, such as an inner pipe section having a helically shaped groove in the outer surface. Such embodiments are included in the term bolt in this context.

The valve according to the invention has many embodiments.

More specifically, the groove is preferably shaped as a helix, optionally with a variable helix pitch and/or cross section area, thereby providing a large throttling range, adaptable to process conditions. Accordingly, the throttling effect can be linear or non-linear, having adjustment sensitivity or signature adaptable to process conditions by adapting the shape and size of the groove. Preferably the valve is adjustable from a dump position of no throttling effect to a position of maximum throttling effect, that is from a position where the bolt is outside the pipe section or the flow path bypasses the groove, to a position where the bolt is fully enclosed by the pipe section. Preferably the valve is remotely operated via a production control system and preferably it comprises means to measure and report flow rate. The flow meter can be a venturi type meter, a flow metering turbine or other type, and the reporting is preferably via the production control system.

The valve is preferably an injection valve for injecting hydrate inhibitor, such as glycol, adapted for connection to a constant supply pressure injection fluid system operated at pressure typically 40-50 bar above a flowing wellhead pressure, whereby the valve can be set to deliver constant or proportional injection fluid flow rate, automatically adjustable to pressure variations between the supply and wellhead pressure.

Preferably the valve includes means for remote installation and retrieval by ROV/ROT (Remotely Operated Vehicle or—Tool). This includes a design having weight and dimension that easily can be handled by a ROV/ROT, by holding the valve in a dedicated handle and stabbing the valve into a dedicated receptacle. More specifically, the valve is preferably adapted to fit into a receptacle on a X-mas tree (production valve tree) on a seabed, throttling the flow between a supply line and the X-mas tree, throttling a typical flow rate 5-200 l/min for dp>40. The pressure drop or differential pressure (dp) over the valve is typically having a design range of 20-200 bar.

Preferably the valve includes components made of erosion resistant ceramic material, in order to withstand contaminated flow over long periods of time, which contamination represents a severe problem, particularly for regenerated fluids such as regenerated MEG. The bolt and pipe sections are preferably made of a zirconia based ceramic material, which design and choice of materials will balance out temperature induced effects, because the bolt and pipe sections will undergo the same process induced effects even while withstanding harsh contamination.

The valve tolerates a severe contamination level in the injection flow, in fact far more contamination can be tolerated than for earlier valve designs. The valve preferably comprises a long and variable throttling section, having axial length longer than ca. 200 mm. The valve preferably comprises a groove flow bore cross section area larger than ca. 70 mm$^2$ and a groove flow bore length longer than ca. 2500 mm. In one embodiment, the groove is formed in the space between matching threads on the bolt and pipe section.

The valve according to the invention has many embodiments, including the features as mentioned above, in any combination.

The invention also provides a system for injection flow throttling to a number of wells on a seabed, comprising one supply line connected to one valve according to the invention for each well, which valve is connected to one X-mas tree (production valve tree) on one well, distinguished in that the system further comprises a device in order to distribute supply line flow between different valves and wells. Preferably said device is a supply line header, providing cross-connection functionality, remotely controllable via a production control system. The system of the invention allows for controlling the supply pressure of merely a single supply line to a pressure at for example 2-3 bar above the highest well pressure, for injection into a number of wells through valves of the invention, without further controls being required as the respective valves will control the injection flow rate based on pressure difference between the supply pressure and the respective well pressure. Accordingly, the system preferably consists of one supply line that is controlled to be at a pressure above the highest well pressure amongst the connected wells, the single supply line is via a device such as a supply line header connected to a number of wells via respective valves of the invention, preferably providing full cross-over functionality with respect to fluid injection into wells or flow between wells. The valves of the system may include any of the features described with respect to the valve, in any combination.

FIGURES

Figure 3:
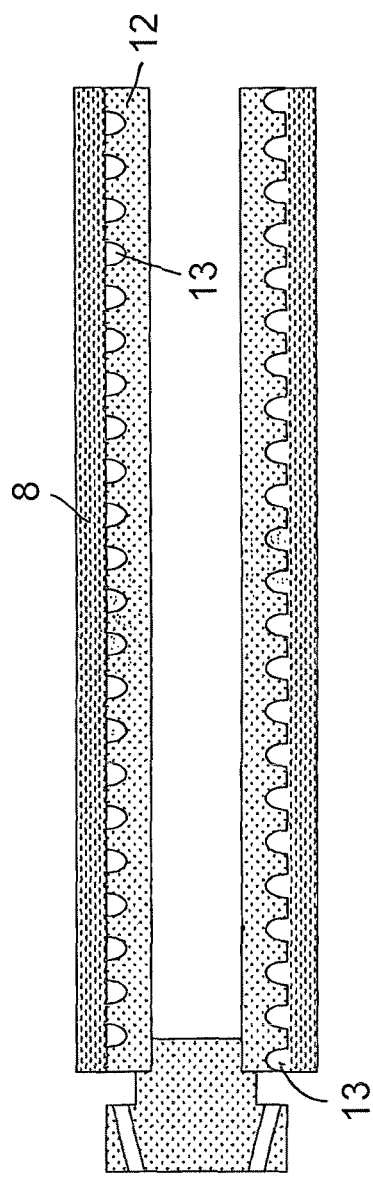
Figure 4:
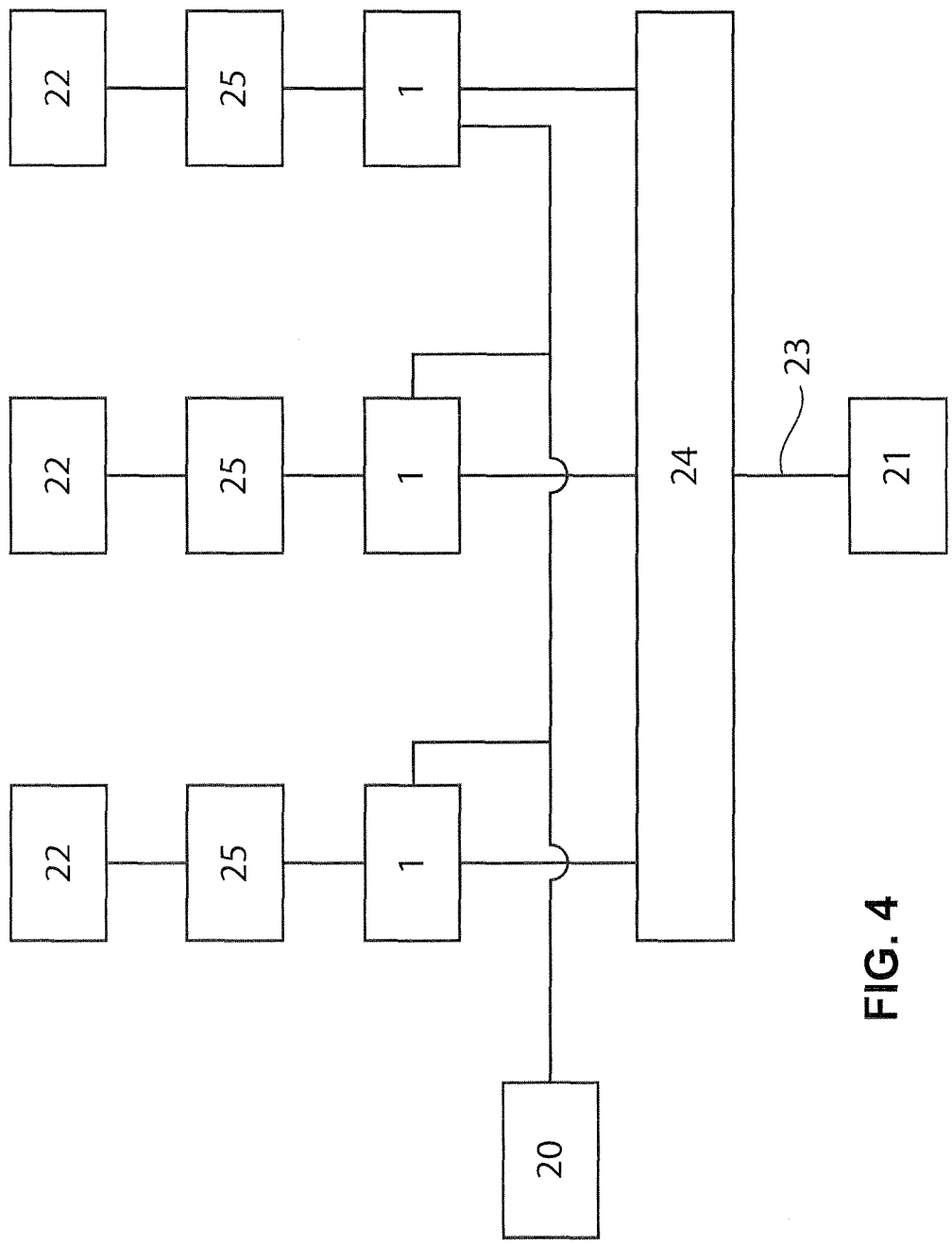

The present invention is illustrated by figures, of which
FIG. 1 illustrates a valve according to the invention,
FIG. 2 illustrates the valve illustrated on FIG. 1 from a side view, and
FIG. 3 illustrates the operating principle of the bolt and pipe section.
FIG. 4 illustrates a plurality of subsea wellheads and a plurality of valves according to an example of the present technology.

DETAILED DESCRIPTION

Reference is made to FIG. 1, illustrating an embodiment of a valve 1 according to the invention. The easily recognizable parts are an outer sleeve 2, a pipe section assembly 3, a stab end 4, a ROV handle 5 and an electrical assembly part 6. The outer sleeve 2 is partly transparent, indicating the internal parts electric motor 7 (means to adjust the axial position of the bolt within the pipe, by moving one or both of the bolt and pipe sections), a part of the outer surface of the pipe section 8, and also a turbine flow meter 9 is indicated. The stab end 4 includes an inlet port 10 and an outlet port 11. The parts are typically concentrically assembled along an axis, having the stab end 4 in front of a conically shaped pipe section assembly 3, which is in front of the means 7 to adjust the axial position of the bolt and pipe section, inside the outer sleeve 2, which again is in front of the ROV handle 5 and the electrical connector 6 (electrical assembly part).

FIG. 2 illustrates the same valve as illustrated on FIG. 1, but as a side view, clearly giving the outline of the design that is adapted for stabbing and handling by an ROV/ROT. After stabbing the valve into a dedicated receptacle, thereby making up the injection fluid flow path, an electrical connector is connected to the electrical connector assembly 6, in order to connect the valve to an electrical control system. In a different embodiment the means for adjusting the axial position of the bolt and pipe section can be hydraulic. Even the means for control of said position can be hydraulic, for example based on the difference in pressure between the well flow pressure and the injection fluid supply system, automatically adjusting the injection flow rate proportional to the well flow rate.

Neither of FIG. 1 or 2 illustrates the bolt or the groove clearly. FIG. 3 illustrates the throttling principle of the bolt 12 and the pipe section 8, illustrating the bolt 12 and a typical groove 13. The bolt 12 fits sealingly into the pipe section 8, which pipe section enclose or encompass the groove machined into the outer surface of the bolt, the groove being open in the radial outward direction. The part of the groove enclosed by the pipe section is locked, forcing the fluid directed into the groove to follow the flowpath as defined by the groove. The direction of flow is either to the right or to the left in the figure, however, the flow being directed inside the pipe section. As mentioned above, the bolt can be hollow, containing one or more bores for flow or feedthroughs, which is the case for the bolt of the illustrated embodiment, which bolt actually is a pipe section that may be termed an inner pipe section in the context of the present invention.

FIG. 4 shows a plurality of subsea wellheads 22. Each subsea wellhead is connected to a production valve tree 25. The production valve tree 25 is connected to a valve 1, such as the valve described above. The valves 1 are connected to a production control system 20 and a supply line header 24. The supply line header 24 is connected to a constant supply pressure injection fluid system 21 by a supply line.

The invention claimed is:

1. A valve for subsea hydrate inhibitor injection into a flow of a subsea wellhead, wherein the hydrate inhibitor comprises eroding particles, the valve comprising:
   A bolt and a pipe section, the pipe section having an inner dimension adapted to enclose the bolt,
   A stab end including an inlet port and an outlet port, axially apart on the stab end, each of the inlet and outlet ports comprises a ring shaped groove formed by a pair of ring-shaped ribs perpendicular to a sidewall of the stab end,
   A confined helix shaped throttling flow bore provided by a groove in at least one of an outer surface of the bolt and an inner surface of the pipe section, and
   Means to adjust the throttling effect of the valve,
   Wherein a confined part of the groove has a length that is variable by moving an axial position of the bolt relative to the pipe section, and adapted so that all of the hydrate inhibitor flows, follows, and flushes a full length of the confined helix shaped throttling bore, and Wherein the groove comprises a groove flow bore cross section area greater than about 70 mm$^2$;

Wherein the stab end is configured to fit into a receptacle on the subsea wellhead.

2. The valve according to claim 1, wherein the groove has variable helix pitch.

3. The valve according to claim 1, wherein the groove has a cross section that varies along a length of the groove.

4. The valve according to claim 1, wherein the valve is adjustable from a dump position of no throttling effect to a position of maximum throttling effect.

5. The valve according to claim 1, wherein the valve comprises ceramic components.

6. The valve according to claim 5, wherein the bolt comprises a first ceramic material and the pipe section comprises a second ceramic material.

7. The valve according to claim 6, wherein the first ceramic material and the second ceramic material are the same.

8. The valve according to claim 7, wherein the first ceramic material and the second ceramic material comprise zirconia.

9. The valve according to claim 1, wherein the valve comprises an ROV handle, and a subsea mateable electric connector, and the stab end is adapted to fit into a receptacle on a subsea production valve tree.

10. The valve according to claim 1, wherein the valve is remotely operated via a production control system.

11. The valve according to claim 1, further comprising a flow meter to measure and report flow rate.

12. The valve according to claim 1, for injecting hydrate inhibitor and adapted to be connected to a constant supply pressure injection fluid system, the constant supply pressure injection operative at pressures from 10 to 250 bar above flowing wellhead pressure.

13. The valve according to claim 12, wherein the valve can be set to deliver constant or proportional injection fluid flow rate, automatically adjustable to pressure variations between the supply and wellhead pressure.

14. A system for injecting hydrate inhibitor into the flow of a plurality of subsea wellheads, the system comprising a supply line connected to a device to distribute supply line flow to the subsea wellheads, each subsea wellhead comprising a production valve tree with the valve according to claim 1 inserted into a receptacle, and each wellhead is connected to the device.

15. The system according to claim 14, wherein the device is a supply line header to deliver the flow to the plurality of subsea wellheads and the supply line header being remotely controllable via a production control system.

16. The valve according to claim 1, wherein the valve is used for injecting hydrate inhibitor into the flow of a subsea wellhead.

17. The system according to claim 14, wherein the system is used for injecting hydrate inhibitor into the flow of a number of subsea wellheads.

18. The valve according to claim 1, wherein the inlet port further comprises a fluid connection to an upstream end of the groove and the outlet port further comprises a fluid connection to a downstream end of the groove.

19. A method for throttling a flow of hydrate inhibitors injected into a production flow at a subsea wellhead, the method comprising:

Providing the flow of hydrate inhibitors to an inlet port of a groove of a valve, the valve comprising a bolt, a pipe section, a stab end including an inlet port and an outlet port, axially apart on the stab end, Each of the inlet and outlet ports comprises a ring shaped groove around the periphery of the stab end formed by a pair of ring-shaped ribs perpendicular to a sidewall of the stab end, and a confined helix shaped throttling flow bore provided by the groove, the groove formed in at least one of an outer surface of the bolt and an inner surface of the pipe section;

Moving at least one of the bolt and the pipe section relative to one another in an axial direction to throttle the flow of hydrate inhibitors; and Injecting the flow of hydrate inhibitors into the production flow from the confined helix shaped throttling flow bore through an outlet port of the valve, Wherein a confined part of the groove has a length that is variable by moving an axial position of the bolt relative to the pipe section, and adapted so that all of the hydrate inhibitor flows, follows, and flushes a full length of the confined helix shaped throttling bore, and Wherein the groove comprises a groove flow bore cross section area greater than about 70 mm$^2$;

Wherein the stab end is configured to fit into a receptacle on the subsea wellhead.

20. The method according to claim 19, wherein the groove has variable helix pitch.

21. The method according to claim 19, wherein the groove has a cross section that varies along a length of the groove.

22. The method according to claim 19, further comprising adjusting the valve from a dump position of no throttling effect to a position of maximum throttling effect.

23. The method according to claim 19, wherein the bolt and the pipe comprise ceramic.

24. The method according to claim 23, wherein the ceramic comprises zirconia.

25. The method according to claim 19, wherein the valve comprises an ROV handle, and a subsea mateable electric connector, and the stab end is adapted to fit into a receptacle on a subsea production valve tree.

26. The method according to claim 19, further comprising remotely operating the valve via a production control system.

27. The method according to claim 19, further comprising measuring and reporting a flow rate with a flow meter.

28. The method according to claim 19, further comprising injecting the flow of hydrate inhibitors with a constant supply pressure injection fluid system at pressures from 10 to 250 bar above a production flow pressure.

29. The method according to claim 28, further comprising setting the valve to deliver an injection fluid flow rate that is constant or proportional relative to the production flow pressure.

30. The method according to claim 29, further comprising automatically adjusting the injection fluid flow rate based on pressure variations between the flow of hydrate inhibitors and the production flow when the injection fluid flow rate is proportional relative to the production flow pressure.

31. The method according to claim 19, wherein the inlet port further comprises a fluid connection to an upstream end of the groove and the outlet port further comprises a fluid connection to a downstream end of the groove.

* * * * *